(12) United States Patent
White et al.

(10) Patent No.: US 10,247,022 B2
(45) Date of Patent: Apr. 2, 2019

(54) SEALING AND RETENTION SYSTEM

(71) Applicant: UNITED TECHNOLOGIES CORPORATION, Farmington, CT (US)

(72) Inventors: Kevin W. White, Jupiter, FL (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 515 days.

(21) Appl. No.: 15/161,619

(22) Filed: May 23, 2016

(65) Prior Publication Data
US 2017/0335703 A1 Nov. 23, 2017

(51) Int. Cl.
*F01D 11/00* (2006.01)
*F01D 25/16* (2006.01)
*F01D 25/24* (2006.01)
*F16J 15/02* (2006.01)
*F16J 15/08* (2006.01)

(52) U.S. Cl.
CPC .......... *F01D 11/005* (2013.01); *F01D 25/162* (2013.01); *F16J 15/022* (2013.01); *F16J 15/0887* (2013.01); *F01D 25/246* (2013.01); *F05D 2220/32* (2013.01); *F05D 2230/237* (2013.01); *F05D 2240/12* (2013.01); *F05D 2240/14* (2013.01); *F05D 2240/55* (2013.01)

(58) Field of Classification Search
CPC .... F01D 11/005; F01D 25/162; F01D 25/246; F16J 15/022; F16J 15/0887; F05D 2220/32; F05D 2230/237; F05D 2240/12; F05D 2240/14; F05D 2240/55
See application file for complete search history.

(56) References Cited

U.S. PATENT DOCUMENTS

2014/0248128 A1    9/2014    Budnick et al.

FOREIGN PATENT DOCUMENTS

| EP | 2520765 | 11/2012 |
| EP | 2930312 | 10/2015 |
| WO | 2014105496 | 7/2014 |
| WO | 2014105800 | 7/2014 |
| WO | 2014105826 | 7/2014 |

OTHER PUBLICATIONS

EP Search report dated Sep. 27, 2017 in EP Application No. 17172269.7.

*Primary Examiner* — Richard A Edgar
(74) *Attorney, Agent, or Firm* — Snell & Wilmer, L.L.P.

(57) ABSTRACT

A seal system for a gas turbine engine is disclosed. The seal system includes a fairing. The seal system also includes a finger seal retention unit attached to the fairing, the finger seal retention unit comprising a channel defining an opening between the fairing and the finger seal retention unit. The seal system also includes a finger seal comprising a tab corresponding to the channel of the finger seal retention unit, the finger seal configured to be removably attached to the finger seal retention unit by inserting the tab into the channel.

20 Claims, 13 Drawing Sheets

SEALING AND RETENTION SYSTEM

FIELD

The present disclosure relates to seals and, more particularly, to finger seal retention systems for gas turbine engines.

BACKGROUND

Turbine Exhaust Cases (TEC) may comprise structural frames that support the aft end of a gas turbine engine. In aircraft applications, the TEC may be utilized to mount the engine to the aircraft airframe. In industrial gas turbine applications, the TEC may be utilized to couple the gas turbine engine to an electrical generator. Due to exposure of the TEC to hot exhaust gas from the turbine module of the gas turbine engine, a fairing that is able to withstand direct impingement of the hot gases may be used to shield the TEC structural frame.

Seals may be used between the fairing and the TEC structural frame to separate hot exhaust gas from cooling air. Due to the specific geometries of various components, finger seals may be used to seal across lengthy distances. Finger seals may be attached to the fairing using a combination of bolts and nuts or rivets and doubler plates in or near the flow path of the hot exhaust gas. Finger seals may also be attached by spot welding.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A seal system for a gas turbine engine is disclosed. The seal system includes a fairing. The seal system also includes a finger seal retention unit attached to the fairing, the finger seal retention unit comprising a channel defining an opening between the fairing and the finger seal retention unit. The seal system also includes a finger seal comprising a tab corresponding to the channel of the finger seal retention unit, the finger seal configured to be removably attached to the finger seal retention unit by inserting the tab into the channel.

In any of the foregoing systems, the channel comprises a first opening end and a second opening end, and the finger seal is removably attached to the finger seal retention unit by inserting the tab into the first opening end, extending the tab through the second opening end, and bending the tab around and over the finger seal retention unit.

In any of the foregoing systems, the opening between the fairing and the finger seal retention unit defined by the channel is completely occupied by the tab.

In any of the foregoing systems, the opening between the fairing and the finger seal retention unit defined by the channel is partially occupied by the tab, and a cooling air gap is bounded by the tab and the fairing, the cooling air gap providing a path for cooling air to pass between the tab and the fairing.

In any of the foregoing systems, the tab is partially bent at an angle prior to being inserted into the channel.

In any of the foregoing systems, the finger seal retention unit is permanently attached to the fairing by welding, brazing, or bonding.

In any of the foregoing systems, the fairing includes a fairing diving board comprising the fairing, the fairing diving board forming a cylindrical shape about an axis of the gas turbine engine.

A gas turbine engine is disclosed. The gas turbine engine includes a fairing diving board. The gas turbine engine also includes a finger seal retention unit attached to the fairing diving board, the finger seal retention unit comprising a channel defining an opening between the fairing diving board and the finger seal retention unit. The gas turbine engine also includes a finger seal comprising a tab corresponding to the channel of the finger seal retention unit, the finger seal configured to be removably attached to the finger seal retention unit by inserting the tab into the channel.

In any of the foregoing gas turbine engines, the channel comprises a first opening end and a second opening end, and the finger seal is removably attached to the finger seal retention unit by inserting the tab into the first opening end, extending the tab through the second opening end, and bending the tab around and over the finger seal retention unit.

In any of the foregoing gas turbine engines, the opening between the fairing diving board and the finger seal retention unit defined by the channel is completely occupied by the tab.

In any of the foregoing gas turbine engines, the opening between the fairing diving board and the finger seal retention unit defined by the channel is partially occupied by the tab, and a cooling air gap is bounded by the tab and the fairing diving board, the cooling air gap providing a path for cooling air to pass between the tab and the fairing diving board.

In any of the foregoing gas turbine engines, the tab is partially bent at an angle prior to being inserted into the channel.

In any of the foregoing gas turbine engines, the finger seal retention unit is permanently attached to the fairing diving board by welding, brazing, or bonding.

A method of forming a seal system for a gas turbine engine is disclosed. The method includes attaching a finger seal retention unit to a fairing, the finger seal retention unit comprising a channel defining an opening between the fairing and the finger seal retention unit. The method also includes removably attaching a finger seal comprising a tab corresponding to the channel of the finger seal retention unit, to the finger seal retention unit by inserting the tab into the channel.

In any of the foregoing methods, the channel comprises a first opening end and a second opening end, and removably attaching the finger seal to the finger seal retention unit comprises inserting the tab into the first opening end of the channel, extending the tab through the second opening end of the channel, and bending the tab around and over the finger seal retention unit.

In any of the foregoing methods, the opening between the fairing and the finger seal retention unit defined by the channel is completely occupied by the tab.

In any of the foregoing methods, the opening between the fairing and the finger seal retention unit defined by the channel is partially occupied by the tab, and a cooling air gap is bounded by the tab and the fairing, the cooling air gap providing a path for cooling air to pass between the tab and the fairing.

In any of the foregoing methods, the method further includes partially bending the tab at an angle prior to inserting the tab into the channel.

In any of the foregoing methods, the method further includes detaching the finger seal by straightening the tab bent around and over the finger seal retention unit, and withdrawing the tab from the finger seal retention unit.

In any of the foregoing methods, attaching the finger seal retention unit to the fairing comprises at least one of welding, brazing, or bonding.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
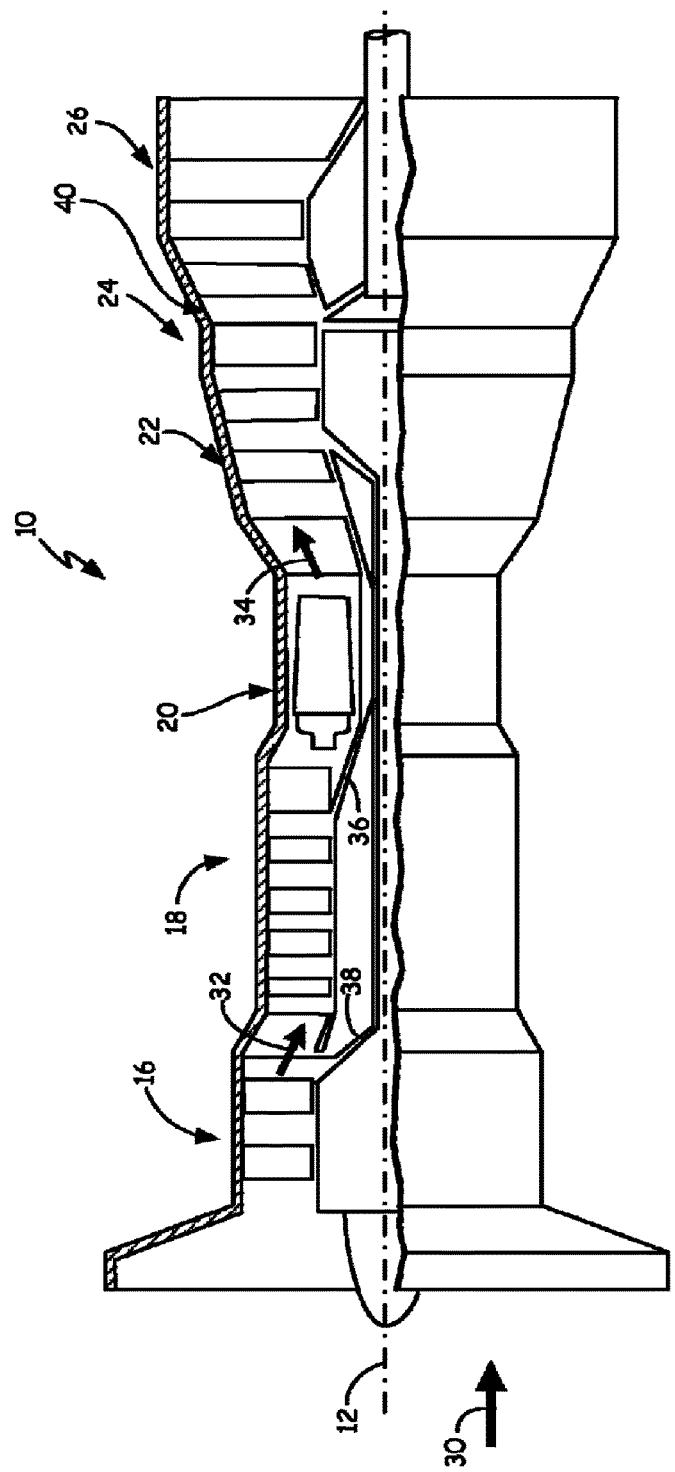
FIG. 1 is a schematic cross-section of an industrial gas turbine engine having a turbine exhaust case.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine.

As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

In various embodiments and with reference to FIG. 1, an exemplary gas turbine engine 10 is provided. Gas turbine engine 10 may be, for example, an industrial gas turbine engine circumferentially disposed about a central, longitudinal axis or axial engine centerline axis 12 as illustrated in FIG. 1. Gas turbine engine 10 includes low pressure compressor section 16, high pressure compressor section 18, combustor section 20, high pressure turbine section 22, and low pressure turbine section 24. Power turbine section 26 may be a free turbine section disposed aft of the low pressure turbine 24.

In operation, low and high pressure compressor sections 16 and 18 pressurize incoming ambient air 30 to produce pressurized air 32. Fuel mixes with pressurized air 32 in combustor section 20, where it is burned. Once burned, combustion gases 34 expand through high and low pressure turbine sections 22 and 24 and through power turbine section 26. High and low pressure turbine sections 22 and 24 drive high and low pressure rotor shafts 36 and 38 respectively, which rotate in response to flow of combustion gases 34 and thus rotate the attached high and low pressure compressor sections 18 and 16.

Low Pressure Turbine Exhaust Case (LPTEC) 40 may be positioned between low pressure turbine section 24 and power turbine section 26. LPTEC 40 defines a flow path for gas exhausted from low pressure turbine section 24 that is conveyed to power turbine 26. LPTEC 40 also provides structural support for gas turbine engine 10 so as to provide a coupling point for power turbine section 26. LPTEC 40 may therefore be rigid and structurally durable.

While a sealing system for LPTEC 40 is described herein, the sealing system described may be applicable to other components of gas turbine engines, such as intermediate cases, mid-turbine frames, and the like.

Figure 2:
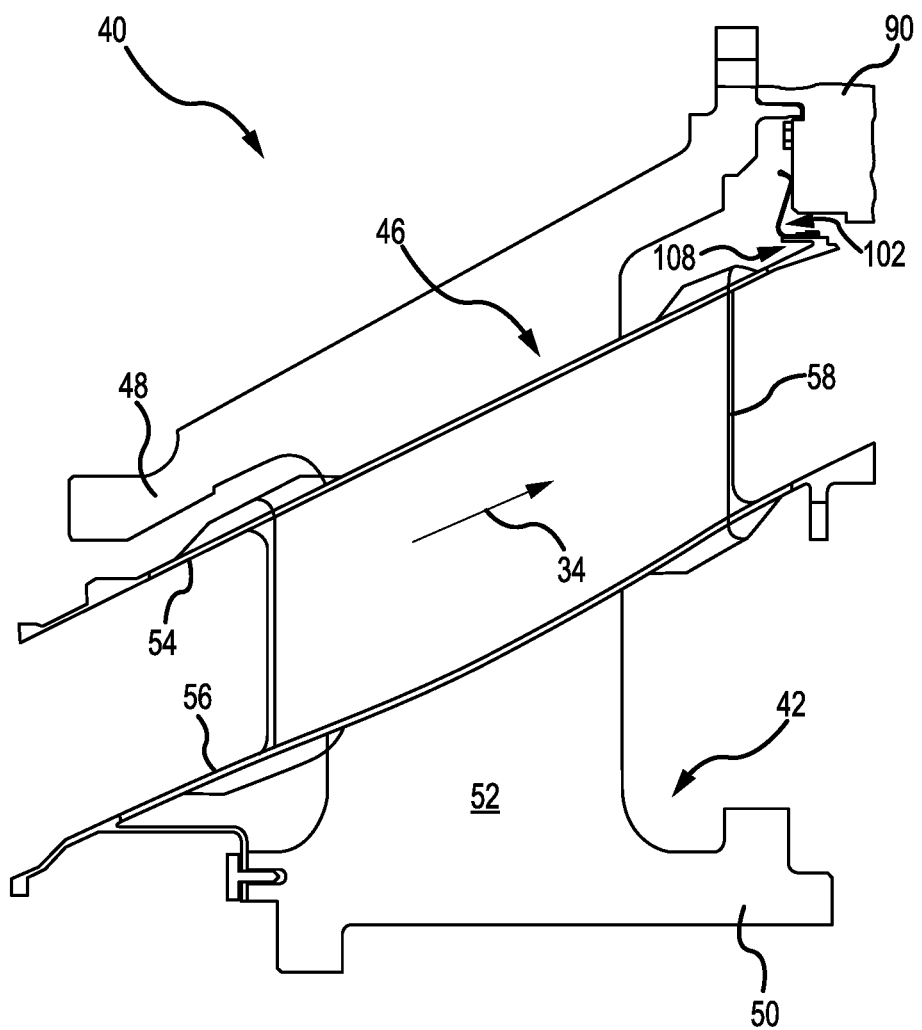
FIG. 2 is a schematic cross-section of a low pressure turbine exhaust case.

With reference to FIG. 2, a cross-section of LPTEC 40 is shown. Fairing 46 is installed within frame 42 which includes frame outer ring 48, frame inner ring 50, and strut 52. Fairing 46 includes fairing outer ring 54, fairing inner ring 56 and vane 58. Fairing diving board 108 is attached to fairing 46, more specifically, to fairing outer ring 54. Finger seal 102 is attached to fairing diving board 108 by finger seal retention unit 104 (shown in FIG. 3A). Finger seal 102 provides a seal against power turbine case 90.

Frame 42 may be a structural, ring-strut-ring body wherein strut 52 is connected to outer ring 48 and inner ring 50. Fairing 46 may be a thin-walled, ring-strut-ring structure that lines the annular flow path 34 through frame 42. Specifically, outer ring 54 and inner ring 56 define the boundaries of the annular flow path 34. Vanes 58 intermittently interrupt the annular flow path 34.

Figure 3A:
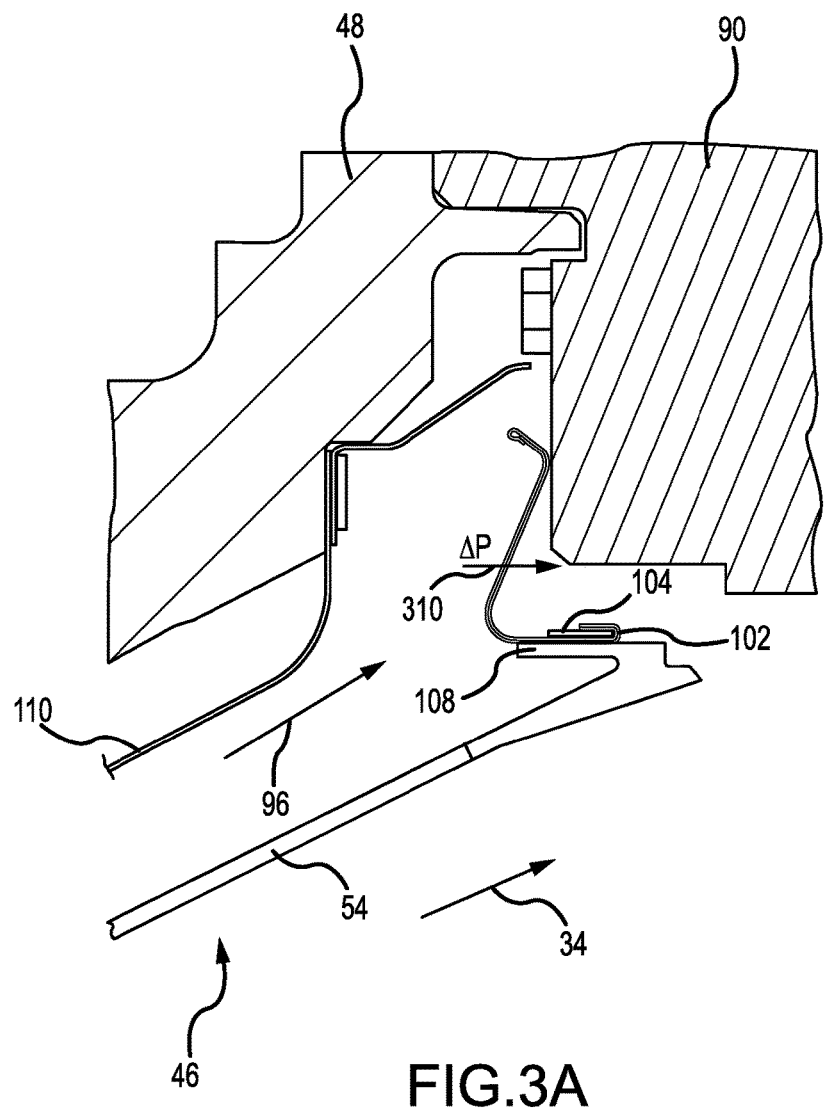
FIGS. 3A-3B are schematic cross-sections of a portion of a low pressure turbine exhaust case.

With reference to FIG. 3A, a portion of LPTEC 40 is shown, including frame outer ring 48, power turbine case 90, fairing 46 including fairing outer case 54 and fairing diving board 108, finger seal 102, and finger seal retention unit 104. Finger seal 102 seals against power turbine case 90. A pressure change 310 is across finger seal 102, such that pressure is higher in the forward direction and lower in the aft direction. A seal against power turbine case 90 is maintained as a result of the pressure change 310 as well as the geometry of finger seal 102 attached to fairing diving board 108. Combustion gases 34 flow through fairing 46 and into power turbine case 90. Cooling air 96 is directed between frame outer ring 48 and fairing 46 to cool fairing 46. Heat shield 110 further protects the frame outer ring 48 from hot temperatures.

Finger seal 102 is attached to fairing diving board 108 by finger seal retention unit 104. Finger seal 102 may be attached to finger seal retention unit 104 by wrapping a tab of the finger seal 102 around the finger seal retention unit 104, as shown in more detail in FIGS. 6A-6D.

Finger seal retention unit 104 is attached to the fairing diving board 108. Finger seal retention unit 104 may be permanently attached to fairing diving board 108 by welding, brazing, or bonding.

Finger seal 102 may become damaged or broken and may be removed to be serviced or replaced. In various embodiments, finger seal 102 is made of a thin metal and fairing 46 is made of a thicker metal. Fairing 46 and fairing diving board 108 may experience high temperatures as a result of the combustion gases 34 flowing through fairing 46. Accordingly, finger seal 102 may be exposed to high temperatures. However, as a result of the different coefficients of thermal expansion of the respective metals used to make finger seal 102 and fairing 46, finger seal 102 may be damaged as a result of the thermal expansion mismatch if bonded to fairing 46.

Finger seal 102 may be removably attached to finger seal retention unit 104. As a result, finger seal 102 may be removed when making repairs or replacement. If finger seal 102 is permanently attached to the fairing 46 using rivets or bolts, when making repairs or replacement, the fairing 46 integrity may be compromised as a result of holes being created and recreated in order to use and replace the rivets or bolts. In addition, attaching finger seal 102 without fasteners results in a lighter system and assembly.

Figure 3B:
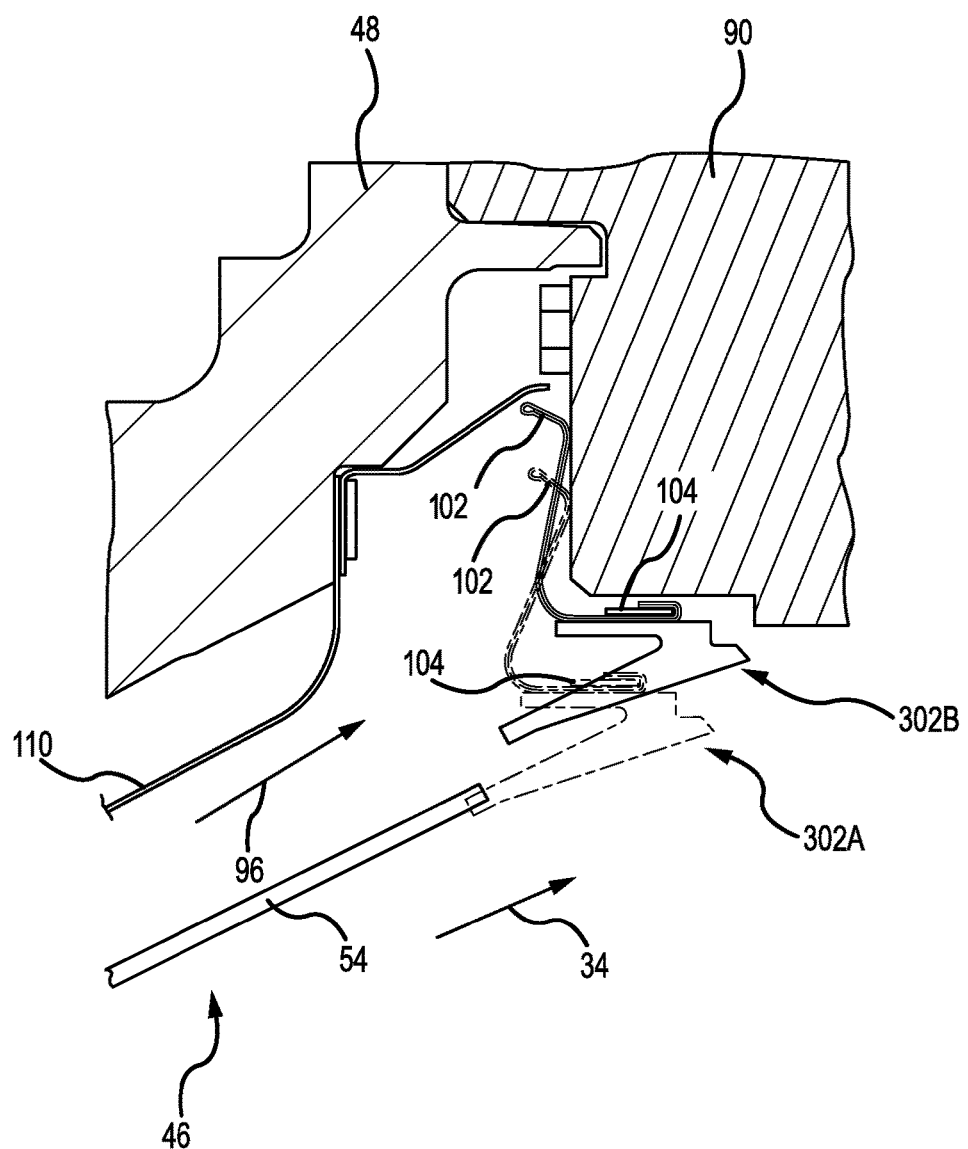

FIG. 3B illustrates a range of motion of finger seal 102, fairing 46 with fairing diving board 108, and finger seal retention unit 104. Fairing 46 may move radially outward (position 302B) or radially inward (position 302A) during operation. The seal against power turbine case 90 is maintained due to the pressure change 310 and the geometry of the finger seal 102.

Figure 4A:
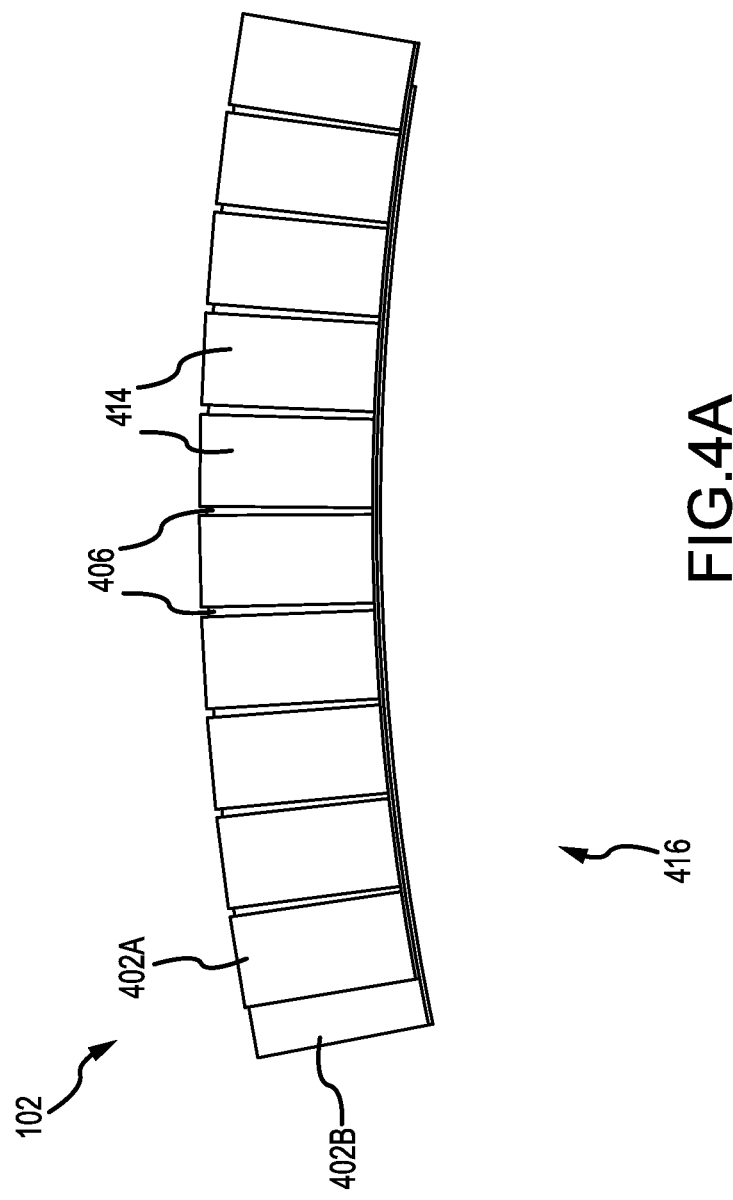
FIGS. 4A, 4B and 4C illustrate a finger seal of a finger seal retention system.
Figure 4B:
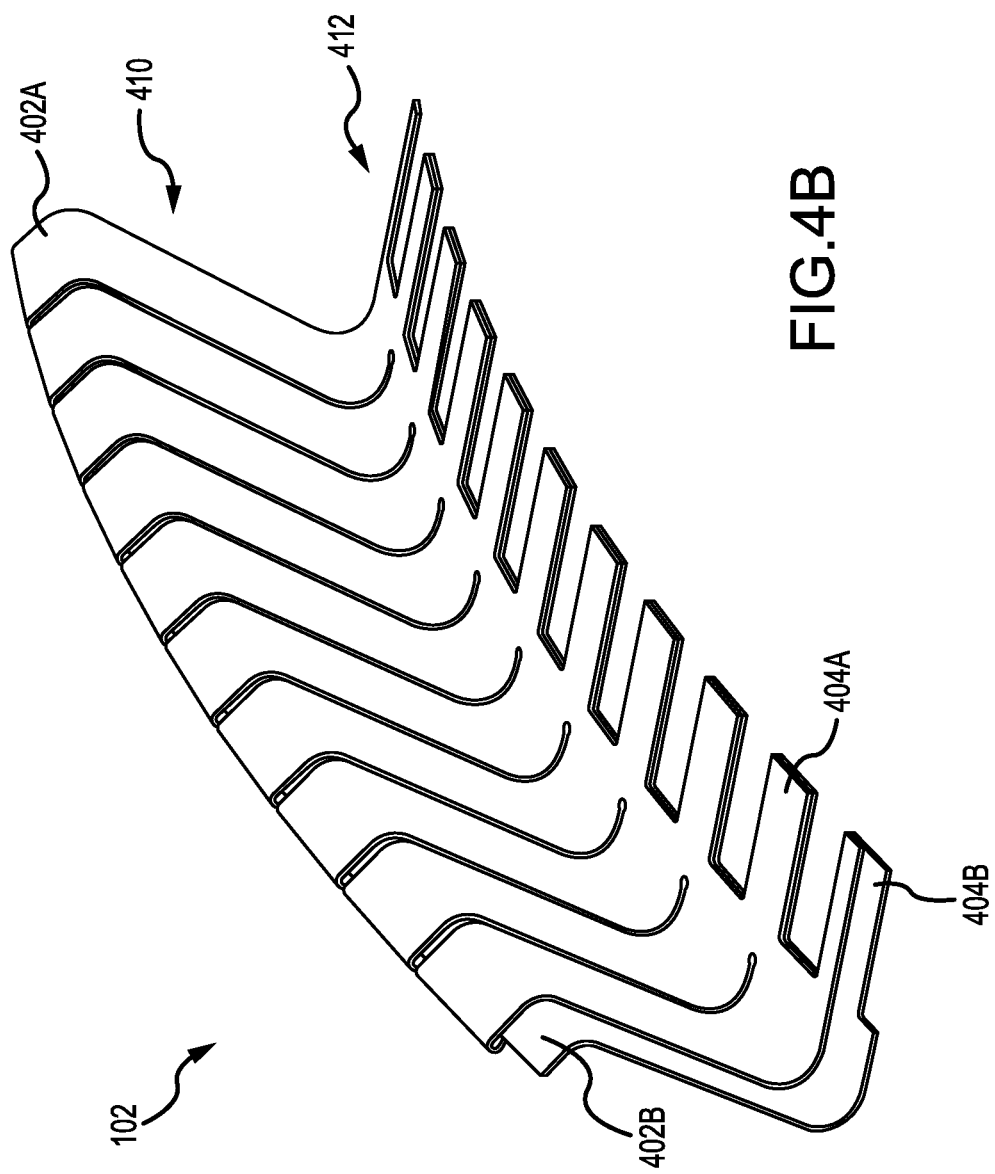
Figure 4C:
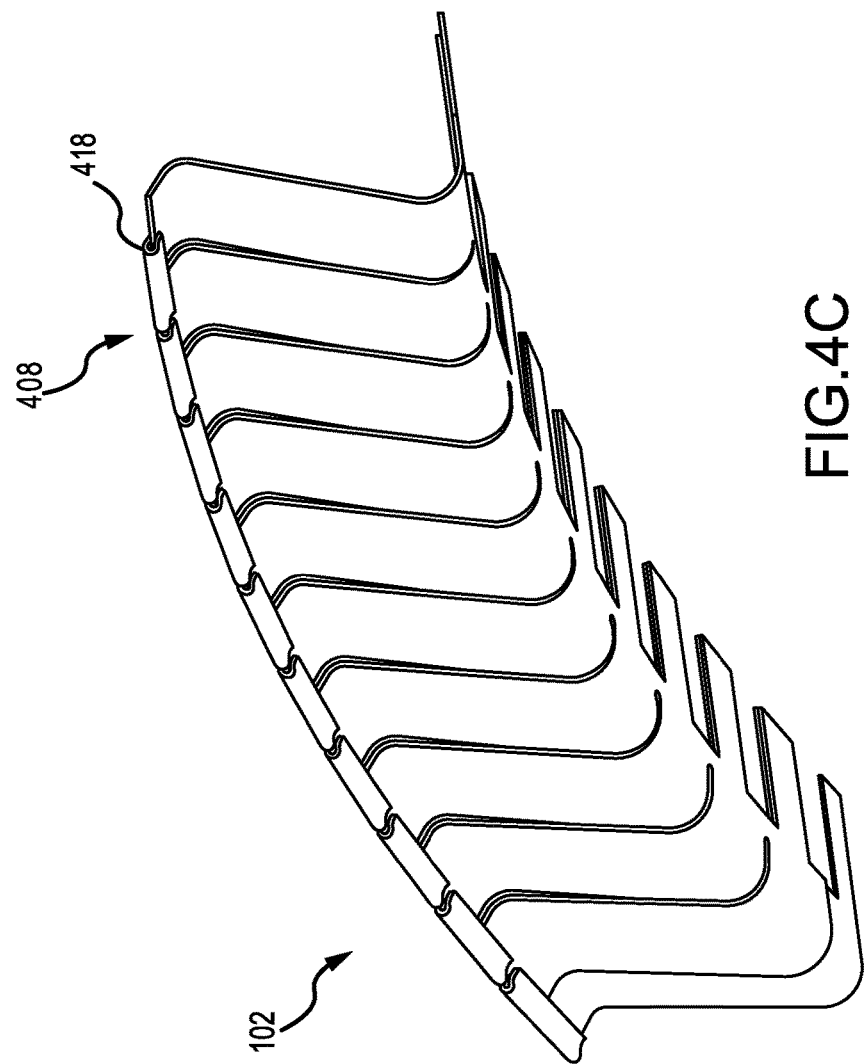

FIGS. 4A-4C illustrate a finger seal 102. Finger seal 102 may have a curved shape 416 to be used in a circular seal, such as in a LPTEC 40. Finger seal 102 may be made of a metal material, such as a nickel alloy and coated with a wear coating. Finger seal 102 includes a first finger seal layer 402A and a second finger seal layer 402B. The geometry of the first finger seal layer 402A and the second finger seal layer 402B are substantially similar.

The fingers 414 within each finger seal layer 402A and 402B may be separated by slots 406. Slots 406 may be between 0 inches and 1.5 inches, or more specifically, between 0.01 inches and 1 inch, or even more specifically between 0.035 inches and 0.092 inches, depending on the curved shape 416 of the finger seal 102. As shown in FIGS. 4A-4C, the first finger seal layer 402A and the second finger seal layer 402B are overlapped, such that the slots 406 of each finger seal layer and the fingers 414 of each finger seal layer do not overlap. As a result, finger seal 102 may be flexible when adjusting the curved shape 416 while maintaining a seal with no gaps for air to pass through.

As shown in FIG. 4B, each finger seal 102 has a finger region 410 with multiple fingers 414 and a tab region 412 with multiple tabs 404. While the slots 406 of first finger seal layer 402A and second finger seal layer 402B may not overlap, the tabs 404A of first finger seal layer 402A and the tabs 404B of second finger seal layer 402B may overlap. In this regard, the first finger seal layer 402A and second finger seal layer 402B are not identical.

FIG. 4C illustrates a view of the finger seal 102 opposite the view of FIG. 4B. The first finger seal layer 402A may form a crimp 418 over the second finger seal layer 402B at the top end 408 of finger seal 102. In various embodiments, the first finger seal layer 402A forms a curve over the second finger seal layer 402B. In various embodiments, the first finger seal layer 402A and the second finger seal layer 402B may be held together by the crimp 418.

Figure 5A:
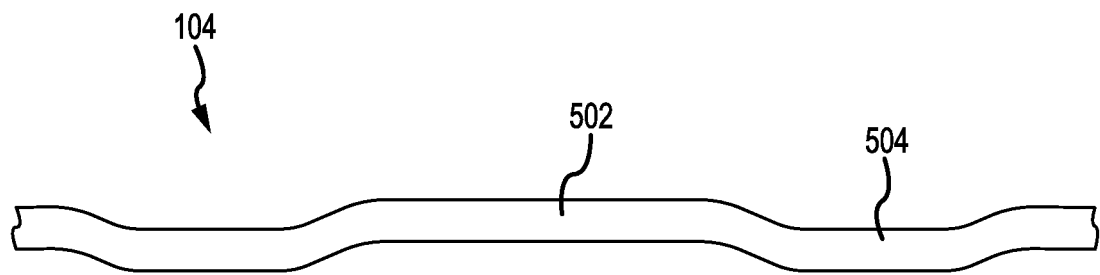
FIGS. 5A-5B illustrate a finger seal retention unit of the finger seal retention system.
Figure 5B:
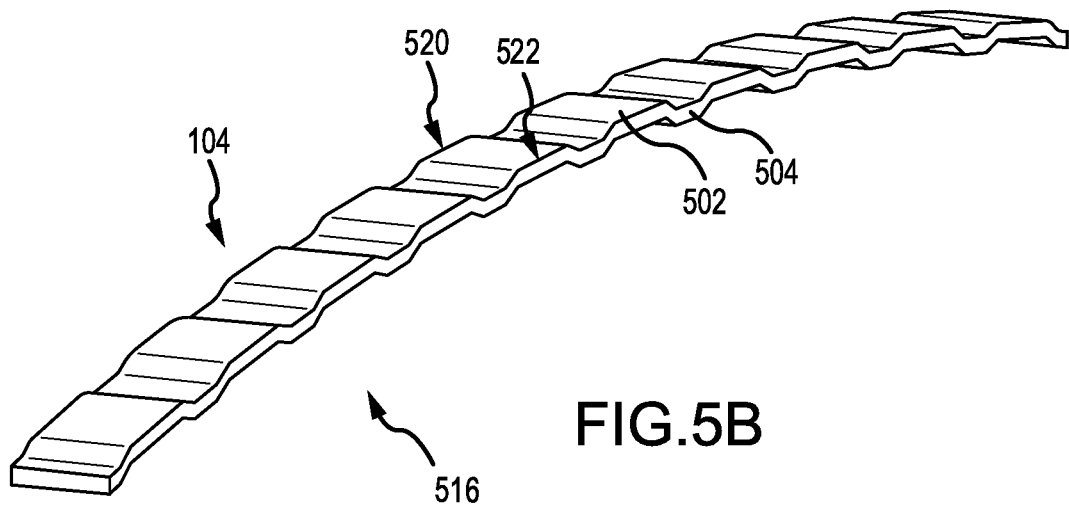

FIGS. 5A-5B illustrate a finger seal retention unit 104. The finger seal retention unit 104 includes a channel 502 and a body 504. The finger seal retention unit 104 may be attached to fairing diving board 108 (with momentary reference to FIG. 1) at body 504, and the finger seal tabs 404 may be attached to the finger seal retention unit 104 by being inserted into channel 502 at a first opening end 520, extended through a second opening end 522, and wrapped around finger seal retention unit 104 at channel 502, as shown in FIGS. 6A-6D.

Finger seal retention unit 104 may be made of any suitable sheet metal, such as a nickel alloy, and may be made of a single piece of material that is shaped to form the channel 502 and body 504 portions. The finger seal retention unit 104 may be any thickness. The finger seal retention unit 104 may be between 0.01 inches and 0.1 inches thick, or more specifically, between 0.04 inches thick and 0.08 inches thick, or even more specifically, between 0.06 inches thick and 0.07 inches thick, or even more specifically, 0.062 inches thick. The finger seal retention unit 104 may also be curved in a shape 516 that corresponds to the curved shape 416 of the finger seal 102.

Figure 6A:
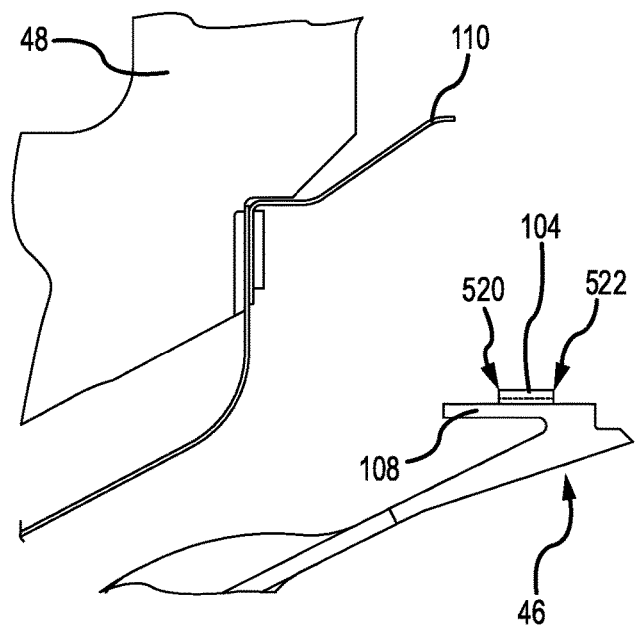
FIGS. 6A, 6B, 6C and 6D illustrate an exemplary process of installing the finger seal retention system.

FIGS. 6A-6D illustrate an exemplary process of installing the finger seal retention system. As shown in FIG. 6A, the finger seal retention unit 104 is attached to fairing diving board 108 of fairing 46. The finger seal retention unit 104 may be permanently attached to the fairing diving board 108. The first opening end 520 and second opening end 522 are also shown in FIG. 6A.

Figure 6B:
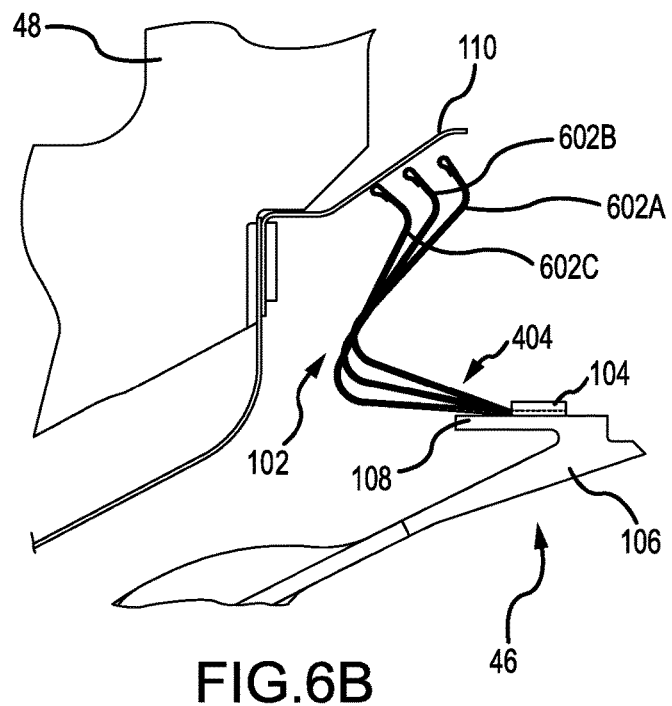

As shown in FIG. 6B, the finger seal 102 is moved (in stages 602A-602C) to align the tabs 404 with the channels 502 of finger seal retention unit 104. Once at stage 602C, the tabs 404 of finger seal 102 are aligned with the channels 502 of finger seal retention unit 104 and may be inserted into the channels 502 of finger seal retention unit 104 at the first opening end 520.

Figure 6C:
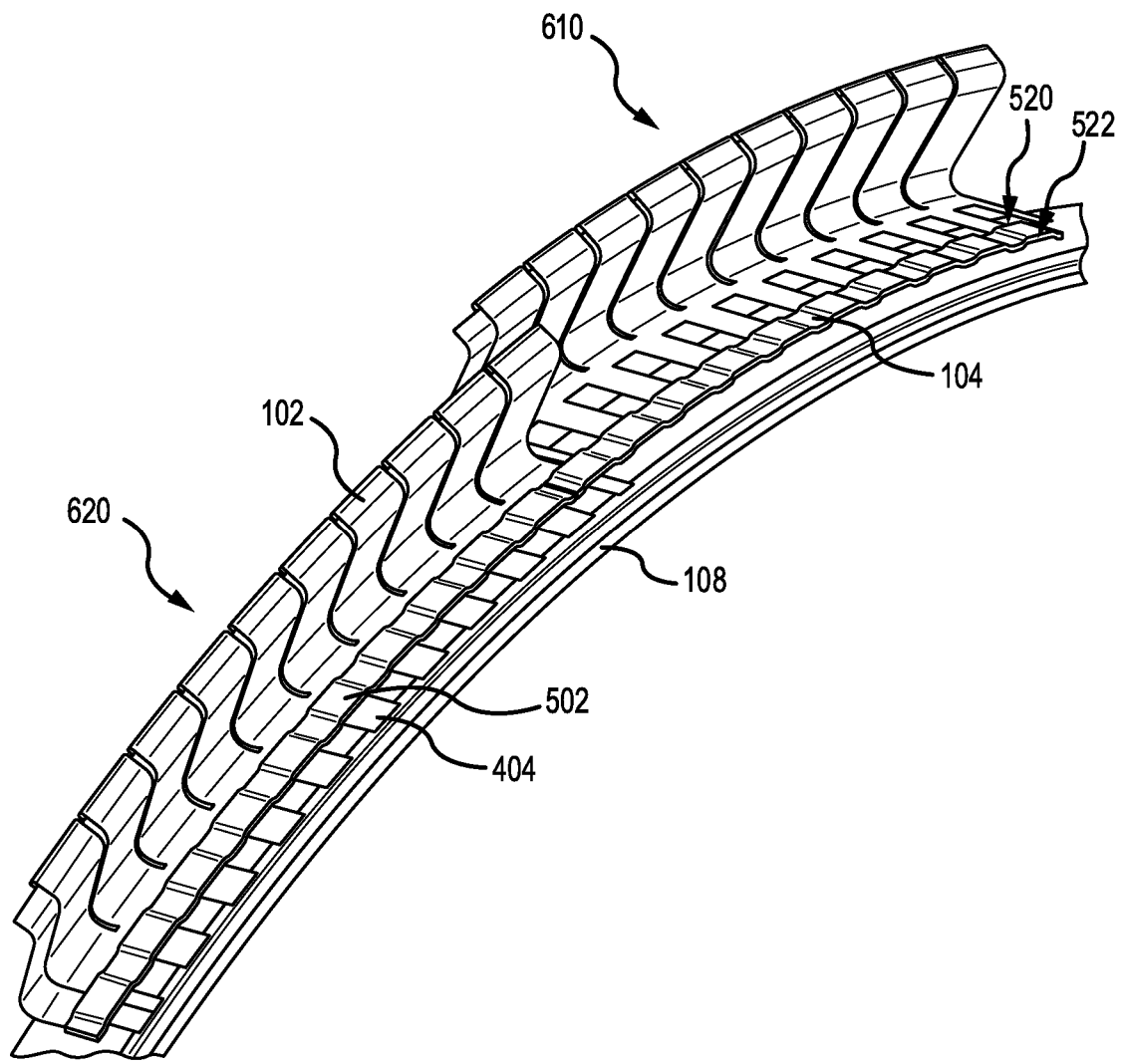

FIG. 6C illustrates the finger seal 102 in an aligned and unengaged position 610 and in an aligned and engaged position 620. In the aligned and unengaged position 610, the tabs 404 are aligned with channels 502 at the first opening end 520, but not inserted into the channels 502. In the aligned and engaged position 620, the tabs 404 are aligned with channels 502, inserted into channels 502 at the first opening end 520, and extended through the second opening end 522 of the channels 502. As shown in FIG. 6C, the finger seal 102 may resemble shiplap in that there are portions of one finger seal 102 that overlap with another finger seal 102. Finger seals 102 may "shiplapped" together by matching one end of a finger seal with the corresponding end of another finger seal, and then inserting into the finger seal retention unit 104. Multiple finger seal sections may be used to form a full, round seal, or a single round finger seal may be used. When multiple sections are used, as shown herein, individual sections may be repaired or replaced without replacing the entire full, round seal.

Figure 6D:
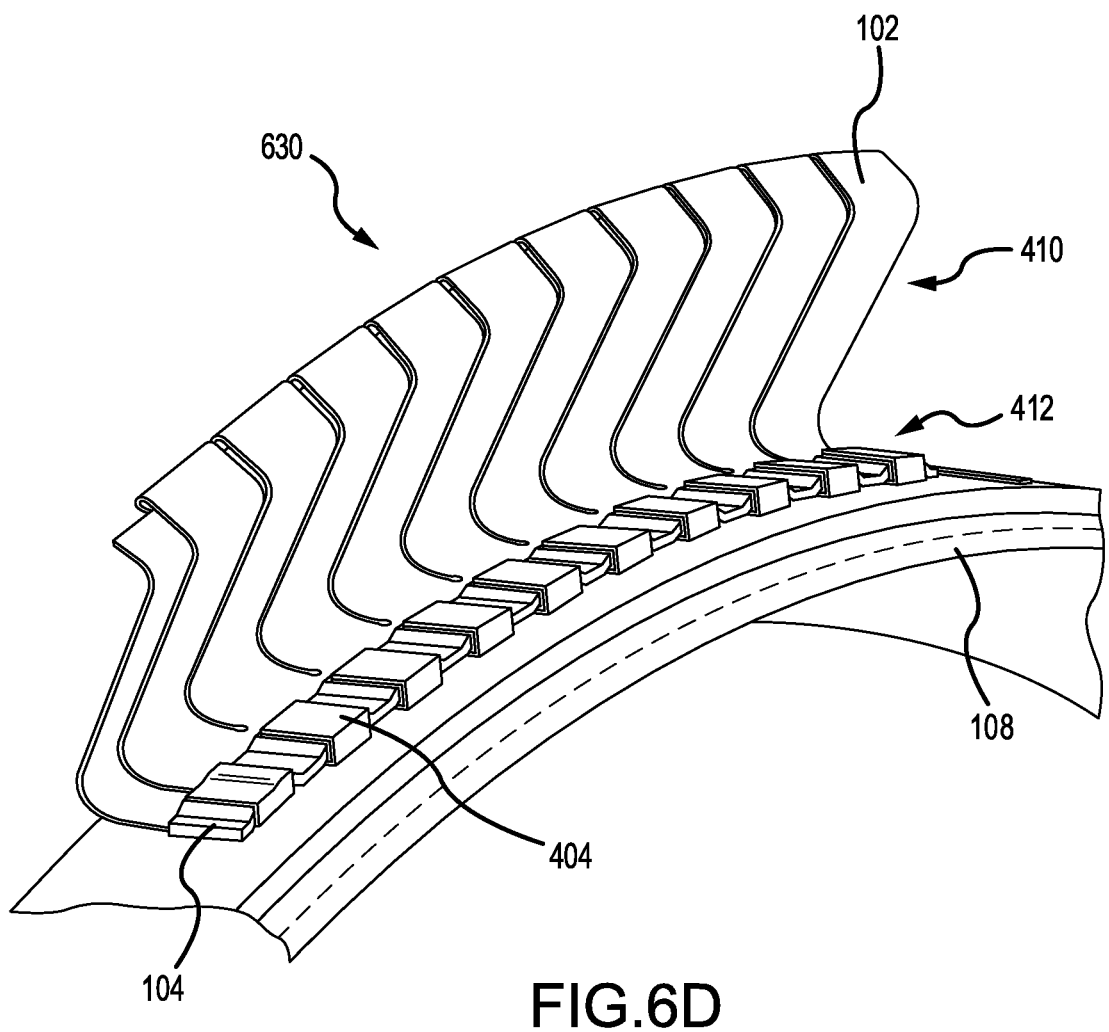

FIG. 6D illustrates the finger seal 102 in a secured position 630, with tabs 404 wrapped around and over the finger seal retention unit 104. In the secured position 630, the finger seal 102 may bend in the finger region 410 when pressure is applied, but the finger seal 102 may not move in the tab region 412 and become separated from finger seal retention unit 104. The tabs 404 may be bent above and over the finger seal retention unit 104 using force and a lever or wedge. In various embodiments, the tabs 404 may be bent at an angle prior to the aligned and unengaged position 610, such that when the aligned and engaged position 620 is achieved, the tabs 404 are raised up at an angle and may be easier to be bent over the finger seal retention unit 104.

Figure 7A:
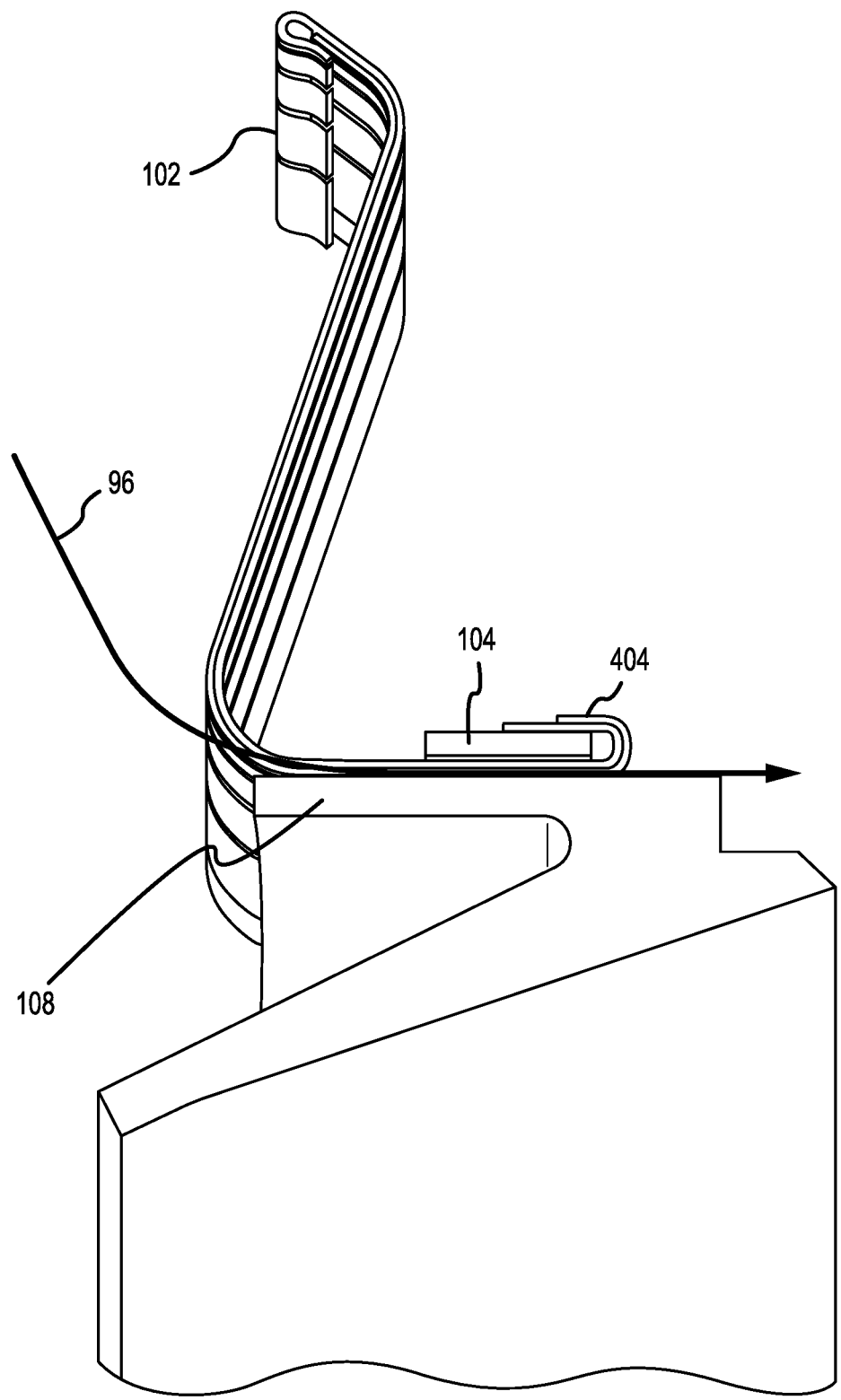
FIGS. 7A-7B illustrate insulating cooling air in the finger seal retention system.
Figure 7B:
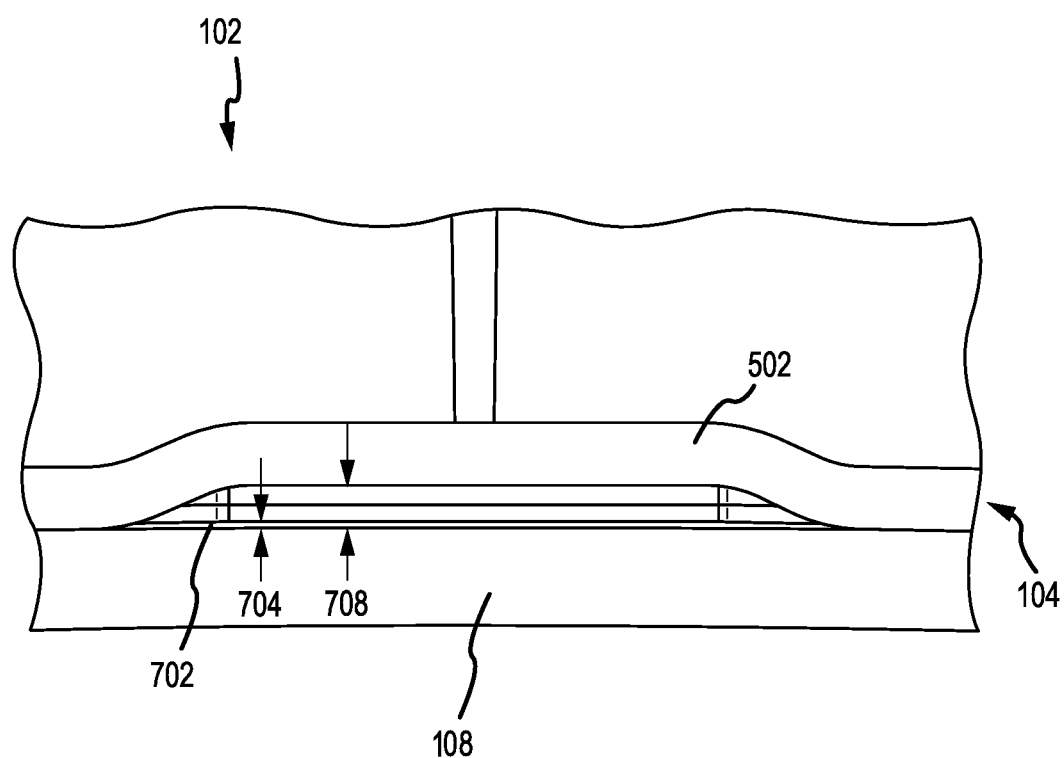

FIG. 7A illustrates a side view of the finger seal 102 in the secured position, with tabs 404 bent around and over the finger seal retention unit 104. Cooling air 96 may pass underneath finger seal 102 and above fairing diving board 108. As shown in FIG. 7B, a finger seal gap 704 may be bounded by the finger seal 102 and the fairing diving board 108. A layer of air 702 from the cooling air 96 may pass through the cooling air gap 704 and provide insulation for the finger seal 102. The insulation provided by the layer of air 702 may reduce the amount of heat transferred from fairing diving board 108 directly to finger seal 102. While heat may transfer through the finger seal retention unit 104, which is attached to the fairing diving board 108, the layer of air 702 assists in reducing the amount of heat transferred.

In alternate embodiments, the finger seal 102 may occupy the entirety of an opening 708 between the finger seal retention unit 104 and the fairing diving board 108, such that there is no cooling air gap 704 for cooling air 96 to pass through and form layer of air 702. In these embodiments, the finger seal 102 may experience more heat transfer from the fairing diving board 108. In these embodiments, a channel may be milled into the fairing diving board 108 with a closer tolerance and the tabs 404 may be inserted into the milled channels of the fairing diving board. A flat strip of metal may be welded on top to trap the seal.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal system for a gas turbine engine, comprising:
   a fairing;
   a finger seal retention unit attached to the fairing, the finger seal retention unit comprising a channel defining an opening between the fairing and the finger seal retention unit; and
   a finger seal comprising a tab corresponding to the channel of the finger seal retention unit, the finger seal configured to be removably attached to the finger seal retention unit by inserting the tab into the channel.

2. The seal system of claim 1, wherein the channel comprises a first opening end and a second opening end, and
wherein the finger seal is removably attached to the finger seal retention unit by inserting the tab into the first opening end, extending the tab through the second opening end, and bending the tab around and over the finger seal retention unit.

3. The seal system of claim 2, wherein the opening between the fairing and the finger seal retention unit defined by the channel is completely occupied by the tab.

4. The seal system of claim 2, wherein the opening between the fairing and the finger seal retention unit defined by the channel is partially occupied by the tab, and
wherein a cooling air gap is bounded by the tab and the fairing, the cooling air gap providing a path for cooling air to pass between the tab and the fairing.

5. The seal system of claim 2, wherein the tab is partially bent at an angle prior to being inserted into the channel.

6. The seal system of claim 1, wherein the finger seal retention unit is permanently attached to the fairing by welding, brazing, or bonding.

7. The seal system of claim 1, wherein the fairing includes a fairing diving board comprising the fairing, the fairing diving board forming a cylindrical shape about an axis of the gas turbine engine.

8. A gas turbine engine comprising:
a fairing diving board;
a finger seal retention unit attached to the fairing diving board, the finger seal retention unit comprising a channel defining an opening between the fairing diving board and the finger seal retention unit; and
a finger seal comprising a tab corresponding to the channel of the finger seal retention unit, the finger seal configured to be removably attached to the finger seal retention unit by inserting the tab into the channel.

9. The gas turbine engine of claim 8, wherein the channel comprises a first opening end and a second opening end, and
wherein the finger seal is removably attached to the finger seal retention unit by inserting the tab into the first opening end, extending the tab through the second opening end, and bending the tab around and over the finger seal retention unit.

10. The gas turbine engine of claim 9, wherein the opening between the fairing diving board and the finger seal retention unit defined by the channel is completely occupied by the tab.

11. The gas turbine engine of claim 9, wherein the opening between the fairing diving board and the finger seal retention unit defined by the channel is partially occupied by the tab, and
wherein a cooling air gap is bounded by the tab and the fairing diving board, the cooling air gap providing a path for cooling air to pass between the tab and the fairing diving board.

12. The gas turbine engine of claim 9, wherein the tab is partially bent at an angle prior to being inserted into the channel.

13. The gas turbine engine of claim 9, wherein the finger seal retention unit is permanently attached to the fairing diving board by welding, brazing, or bonding.

14. A method of forming a seal system for a gas turbine engine, comprising:
attaching a finger seal retention unit to a fairing, the finger seal retention unit comprising a channel defining an opening between the fairing and the finger seal retention unit;
removably attaching a finger seal comprising a tab corresponding to the channel of the finger seal retention unit, to the finger seal retention unit by inserting the tab into the channel.

15. The method of claim 14, wherein the channel comprises a first opening end and a second opening end, and
wherein removably attaching the finger seal to the finger seal retention unit comprises:
inserting the tab into the first opening end of the channel,
extending the tab through the second opening end of the channel, and
bending the tab around and over the finger seal retention unit.

16. The method of claim 15, wherein the opening between the fairing and the finger seal retention unit defined by the channel is completely occupied by the tab.

17. The method of claim 15, wherein the opening between the fairing and the finger seal retention unit defined by the channel is partially occupied by the tab, and
wherein a cooling air gap is bounded by the tab and the fairing, the cooling air gap providing a path for cooling air to pass between the tab and the fairing.

18. The method of claim 15, further comprising partially bending the tab at an angle prior to inserting the tab into the channel.

19. The method of claim 15, further comprising detaching the finger seal by straightening the tab bent around and over the finger seal retention unit, and withdrawing the tab from the finger seal retention unit.

20. The method of claim 14, wherein attaching the finger seal retention unit to the fairing by welding, brazing, or bonding.

* * * * *